Feb. 11, 1958 B. POUZOLS 2,823,309

GAIN CONTROL FOR WIRELESS RECEIVER

Filed Dec. 6, 1954 3 Sheets-Sheet 1

INVENTOR
BERNARD POUZOLS
BY Fred M. Vogel
AGENT

GAIN CONTROL FOR WIRELESS RECEIVER

Filed Dec. 6, 1954 3 Sheets-Sheet 2

INVENTOR
BERNARD POUZOLS
BY Fred M. Vogel
AGENT

INVENTOR
BERNARD POUZOLS
BY Fred M. Vogel
AGENT

United States Patent Office 2,823,309

Patented Feb. 11, 1958

2,823,309

GAIN CONTROL FOR WIRELESS RECEIVER

Bernard Pouzols, Saint Cloud, France, assignor, by mesne assignments, to North American Philips Company, Inc., New York, N. Y., a corporation of Delaware Application December 6, 1954, Serial No. 473,321

Claims priority, application France December 24, 1953

4 Claims. (Cl. 250—27)

The present invention relates to wireless receivers. More particularly, the invention relates to automatic volume control circuit arrangements or devices for use in wireless receivers.

It is known that, if a variable negative potential provided by a device for automatic volume control is applied to the input stage of a wireless receiver, the amplification of the input stage is limited thereby. If the signal appearing at the input is weak, the background noise produced by the subsequent stages and more particularly by the mixing stage (the noise of the input stage is increased by the noise of the mixing stage) becomes predominant, resulting in a decreased signal-to-noise ratio.

If F indicates the noise factor of the complete receiver, $F_1$ indicates the noise factor of the input stage only, $F_2$ indicates the noise factor of the second stage, $F_n$ indicates the noise factor of the *n*th stage, $G_1$ indicates the amplification of the first stage, $G_2$ indicates the amplification of the second stage and $G_n$ indicates the amplification of the *n*th stage, it is known that $$F=F_1+\frac{F_2}{G_1}+\frac{F_3}{G_1G_2}+\cdots+\frac{F_n}{G_1G_2\ldots G_n}+\cdots$$

However, if the voltage for automatic volume control is not applied to the input stage, the subsequent stages are liable to be saturated if the input signal is very strong, said signal in addition being materially amplified by the input stage.

Consequently, the voltage for automatic volume control must be applied to the input stage only if the input signal is so strong that the background noise can be neglected.

Furthermore, it is necessary to amplify the voltage for automatic volume control at the input stage, in order that, when applied to this stage, it increases much more rapidly than the voltage applied to the other stages. If this is not done, the subsequent stages are liable to be completely blocked before the amplification of the input stage has been materially reduced. This is due to the usual form of the characteristic curve of the anode current as a function of the grid voltage of conventional amplifying tubes. Said curve is such that the slope varies slightly upon variation of the biassing potential about the normal working point and varies very rapidly upon equal variation of the biassing potential about the blocking point of the anode current.

The conventional devices for producing a delayed and amplified voltage for automatic volume control utilize direct-voltage amplifiers which may be designed and constructed only with difficulty and which may be unstable in operation.

The object of the invention is to provide a simple and stable AVC device of the type described in which the above-mentioned disadvantages are avoided.

The device of the present invention comprises an alternating-voltage amplifier, the gain factor of which is varied by applying the voltage for automatic volume control to a suitable electrode of an amplifying tube thereof. An alternating voltage is supplied to the circuit of said amplifying tube and rectified in the output thereof. The rectified voltage is combined with another direct voltage, which is preferably constant, and is subsequently applied to one or more stages of the receiver. Provision is made of a limiter to give the voltage, before it is applied to the said stage or stages, an absolute value which is relatively low or zero as long as the automatic volume control voltage has not reached a magnitude of predetermined value.

The negative voltage for automatic volume control, supplied by a usual rectifier of radio signals, or by a rectifier specially designed for this purpose, or by any other suitable device, may be applied directly to one or more amplifying stages other than the input stage or stages (for example to one or more intermediate-frequency stages) and the amplified and retarded resultant voltage referred to may be applied to the input stage or stages.

In order that the invention may be readily carried into effect, it will now be described with reference to the accompanying drawings, wherein.

Figure 1:
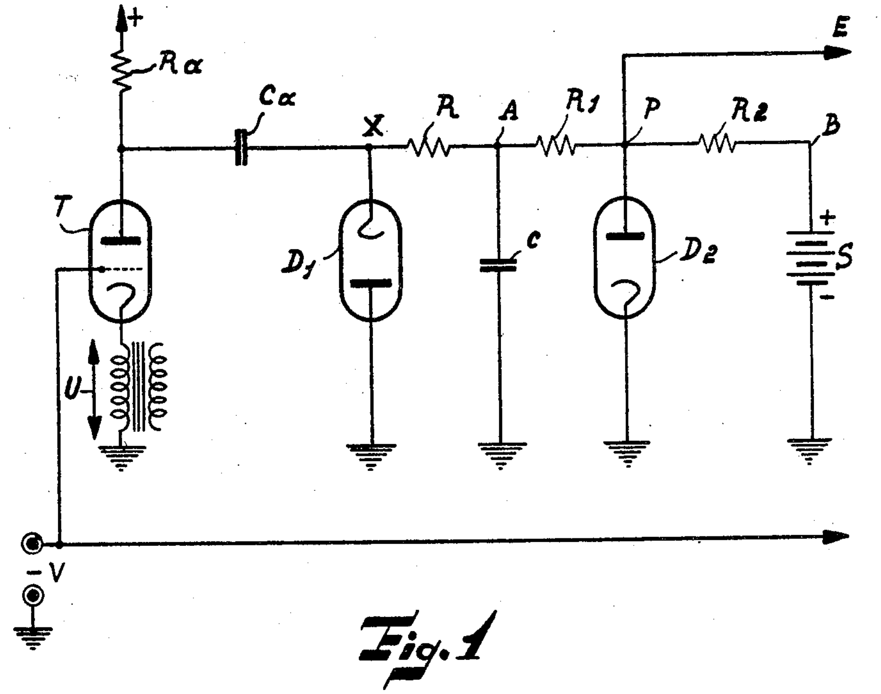
Fig. 1 is a schematic diagram of an embodiment of the AVC device of the present invention.

In the embodiment of Fig. 1, a negative voltage —V for automatic volume control is applied to the control grid of a triode T, the cathode of which has applied to it a sinusoidal or non-sinusoidal alternating voltage U. If the negative voltage —V applied to the grid has a low absolute value, the triode T normally amplifies the alternating voltage applied to the cathode, a material alternating voltage appearing at the terminals of an anode load resistor R*a*. However, if the negative voltage —V has a high absolute value, the alternating voltage produced by the triode T is small or even zero, so that the tube T may be cut off.

The anode of tube T is coupled, for example via a capacitance C*a*, to a rectifying diode $D_1$, which is so connected that the rectified voltage in the example chosen is positive with respect to the chassis. Positive pulses thus occur at point X, corresponding to the positive parts of the alternating voltage wave provided by tube T.

Said rectified positive voltage is filtered by a circuit R-C which provides, at point A, a stabilized direct-voltage which thus depends upon the alternating voltage of the tube T. Since the last-mentioned voltage varies in the opposite sense to the absolute value of the voltage —V for automatic volume control, a positive direct voltage occurs at point A, which direct voltage is lower as the absolute value of the voltage —V is higher, and conversely.

The point A constitutes one extremity of a potentiometer chain $R_1$, $R_2$, of which the other extremity B is connected to the negative terminal of a source S of constant high direct voltage.

When considering an intermediate point P of the potentiometer $R_1$, $R_2$, its voltage will be highly negative (equal or substantially equal to the voltage of source S), if the voltage at point A is zero or of low magnitude (in case of a high negative value of the voltage —V for automatic volume control). If, on the contrary, the positive voltage at point A is of high magnitude (in case of a low negative value of the voltage —V), point P may have a positive potential. In other words, the voltage of point P varies in the same sense as the voltage for automatic volume control V, but materially amplified by tube T.

To prevent the potential at point P from assuming a positive value, a diode $D_2$ is connected between point P and the chassis to constitute a short circuit between point P and the chassis if point P has a tendency to become positive, and to constitute an infinite impedance if point P is negative. It will be evident that point P can assume a zero potential or a negative potential only when its absolute value is more negative with respect to the grid voltage of triode T. Consequently, the negative voltage at point P occurs only if the amplification of the triode T has decreased to such an extent that the positive direct voltage at point A is low.

In the circuit arrangement of Fig. 1, the voltage $-V$ for automatic volume control is thus used for varying the gain factor of an alternating-voltage amplifier. A suitable rectifier ($D_2$) is connected in the output of said amplifier so that the direct voltage produced is zero or negative and its absolute value increases rapidly from the moment the absolute value of the voltage $-V$ reaches a predetermined threshold value. The produced voltage may be applied via a lead E to the input tube or tubes of the receiver of which said amplifier is a part.

It will be evident that the delay and the amplification of the voltage obtained at point P may be varied as desired by a suitable choice of the value of the alternating voltage (U) applied to the cathode of triode T, of the type of triode (T) utilized, of the operating conditions and of the values of the other components of the circuit arrangement or device.

The operation of the AVC device remains unchanged if triode T is replaced by a multigrid tube, or if the alternating voltage is applied to an electrode other than the cathode, and if the negative voltage for automatic volume control is applied to an electrode other than the first grid, provided that the negative voltage for automatic volume control decreases the alternating voltage appearing at the anode (or at another electrode fulfilling this function) in magnitude. The diodes may be replaced by other rectifying devices and the filter circuit R–C may be omitted and replaced by a single capacitor C between the point P and ground; resistor $R_1$ fulfilling the function of a filter resistor, as in Fig. 2.

Figures 2, 3:
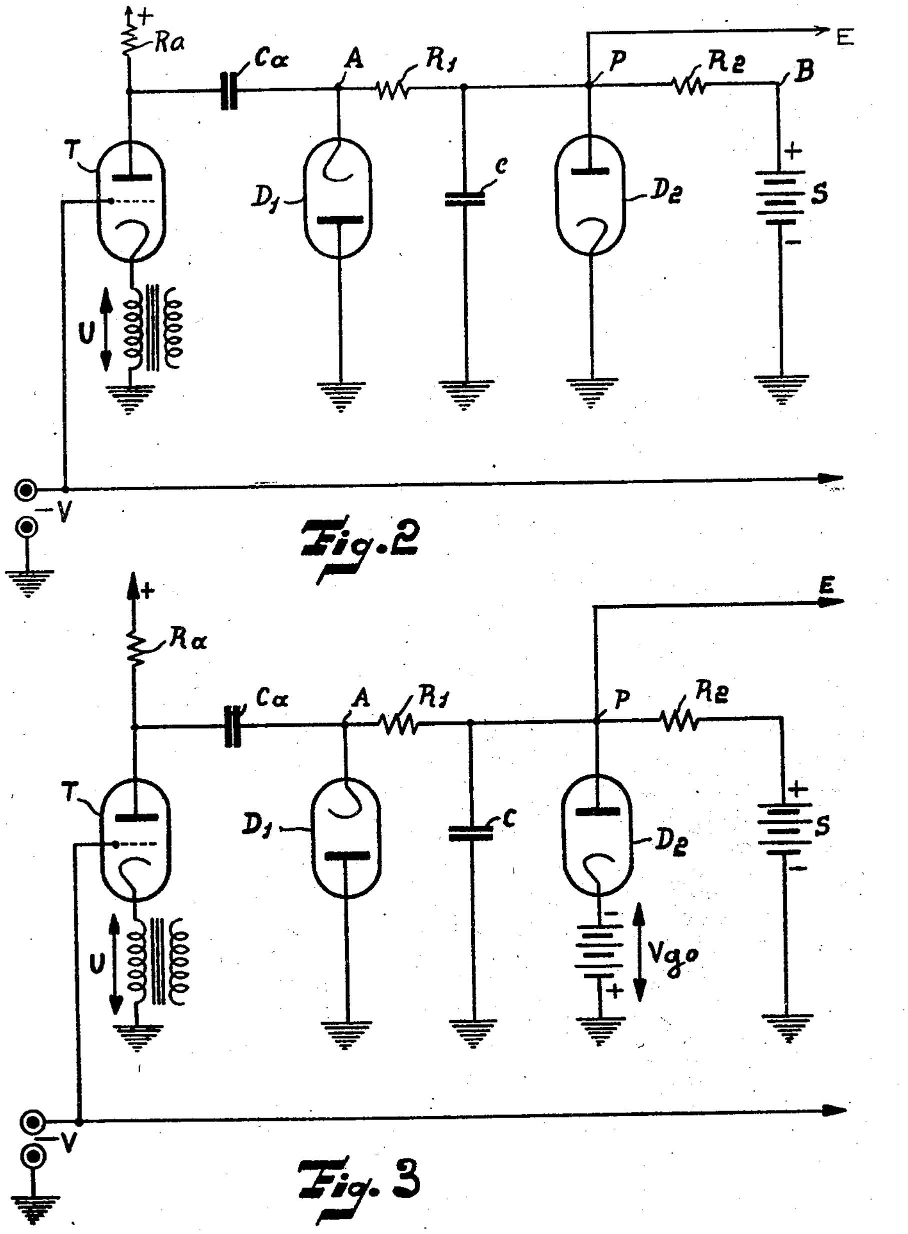
Fig. 2 is a modification of the embodiment of Fig. 1.
Fig. 3 is a schematic diagram of another embodiment of the AVC device of the present invention.

The embodiment of Fig. 3 of the AVC device of the present invention, permits the obtaining of the low negative voltage $-V_{go}$ required for biassing the input tube or tubes.

If the cathode of diode $D_2$ is connected to a source of negative constant direct-voltage $-V_{go}$ having a low internal resistance, the voltage appearing at point P cannot assume a value of magnitude between zero and $-V_{go}$; the point P voltage always being algerbraically lower than, or equal to $-V_{go}$.

Figure 4:
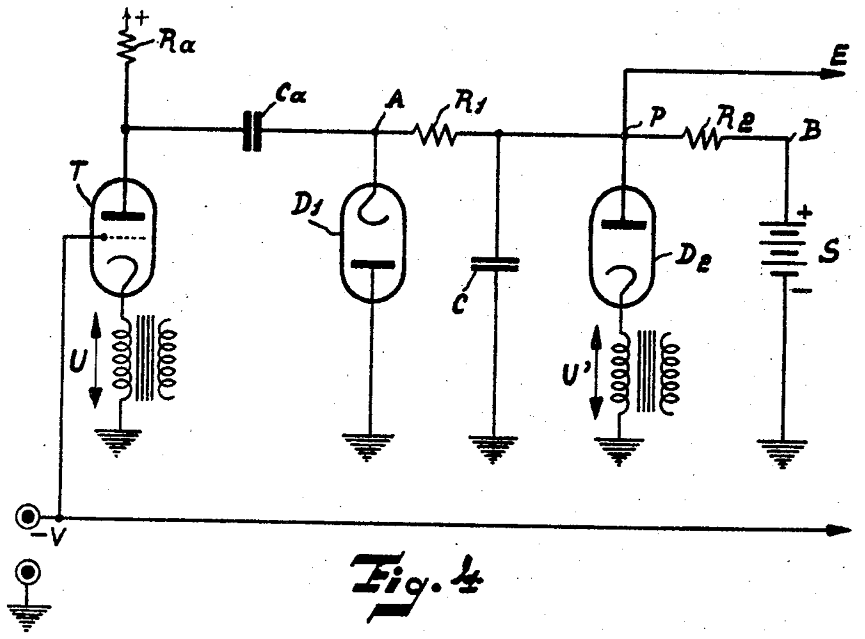
Fig. 4 is a modification of Fig. 3.

In Fig. 4, the same result may be obtained if an alternating voltage U′ having a value of magnitude equal to $-V_{go}$ is applied to the cathode of diode $D_2$ and if the alternating component which could occur at point A is suppressed by the decoupling capacitor C. The anode-cathode space of diode $D_2$ thus operates as a rectifier of the alternating voltage applied to the cathode of diode $D_2$ and provides a negative voltage $-V_{go}$. If, the absolute value of the negative voltage provided by the potentiometer $R_1$, $R_2$ is higher than $-V_{go}$, the rectifier $D_2$ becomes inoperative.

Figure 5:
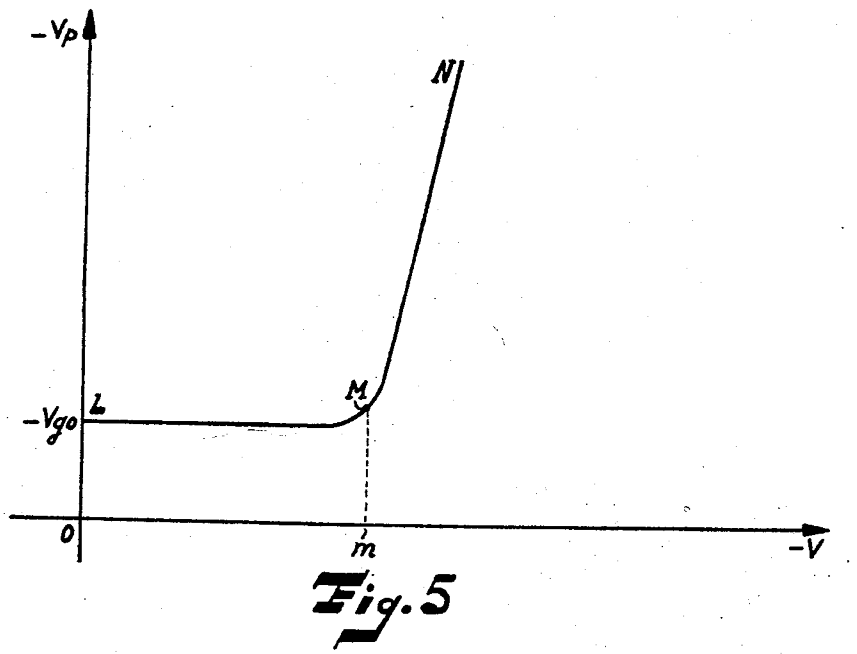
Fig. 5 is a graphical presentation of a curve showing the variation of a voltage produced by the AVC device of the invention as a function of the voltage for automatic volume control.

Fig. 5 shows the variation of the voltage $-V_p$ at point P as a function of the voltage $-V$ for automatic volume control. The curve LMN has been measured experimentally with the circuit arrangement of Fig. 4. LM is an axis of ordinates $-V_{go}$, of which the length O$m$ indicates the delay voltage or the value of magnitude which the voltage $-V$ must attain before the negative voltage $-V_p$ increases. The slope of MN corresponds to the amplification of the AVC device.

The described embodiments of the circuit arrangement or device of the present invention may be used in the transmission of signals for automatic volume control to one or a plurality of stages of a receiver. However, the invention is also applicable if it is necessary to derive from a direct voltage of given polarity another direct voltage of the same polarity or opposite polarity, but amplified and delayed with respect to the first-mentioned voltage.

It will be evident that several modifications of the described embodiments are possible within the scope of the invention; notably by substitution of equivalent technical means. It is to be understood that the invention is not limited to the details disclosed but includes all such variations and modifications as fall within the spirit of the invention and the scope of the appended claims.

What is claimed is:

1. In an automatic volume control system, a circuit arrangement comprising an electron discharge device having a plurality of electrodes, means for applying an automatic volume control voltage to one of said plurality of electrodes thereby to vary the gain of said device, means for applying an alternating voltage to a second of said plurality of electrodes, means for deriving an alternating voltage from a third of said plurality of electrodes, means for rectifying the derived alternating voltage thereby to produce a first direct voltage, means for producing a second direct voltage, means for combining said first direct voltage with said second direct voltage to produce a resultant voltage, and means coupled to said combining means for limiting the magnitude of said resultant voltage to a relatively low absolute value when the magnitude of said automatic volume control voltage is below a predetermined absolute value.

2. In an automatic volume control system, a circuit arrangement comprising an electron discharge device having a plurality of electrodes, means for applying an automatic volume control voltage to one of said plurality of electrodes thereby to vary the gain of said device, means for applying an alternating voltage to a second of said plurality of electrodes, means for deriving an alternating voltage from a third of said plurality of electrodes, means for rectifying the derived alternating voltage thereby to produce a first direct voltage, means for producing a second direct voltage, means for combining said first direct voltage with said second direct voltage to produce a resultant voltage, and means coupled to said combining means for limiting the magnitude of said resultant voltage to a relatively low absolute value when the magnitude of said automatic volume control voltage is below a predetermined absolute value and for permitting the magnitude of said resultant voltage to increase substantially in absolute value when the magnitude of said automatic volume control voltage exceeds said predetermined absolute value.

3. In an automatic volume control system, a circuit arrangement comprising an electron discharge device having a cathode, an anode and a control grid, means for applying an automatic volume control voltage to said control grid thereby to vary the gain of said device, means for applying an alternating voltage to said cathode, means for deriving an alternating voltage from said anode, means for rectifying the derived alternating voltage thereby to produce a first direct voltage, means for producing a second direct voltage, means for combining said first direct voltage with said second direct voltage to produce a resultant voltage, and means coupled to said combining means for limiting the magnitude of said resultant voltage to a relatively low absolute value when the magnitude of said automatic volume control voltage is below a predetermined absolute value.

4. In an automatic volume control system, a circuit arrangement comprising an electron discharge device having a cathode, an anode and a control grid, means for applying an automatic volume control voltage to said control grid thereby to vary the gain of said device, means for applying an alternating voltage to said cathode, means for deriving an alternating voltage from said anode, means for rectifying the derived alternating voltage thereby to produce a first direct voltage, means for producing a second direct voltage, means for combining said first direct voltage with said second direct voltage to produce a resultant voltage, and means coupled to said combining means for limiting the magnitude of said resultant voltage to a relatively low absolute value when the magnitude of said automatic volume control voltage is below a predetermined absolute value and for permitting the magnitude of said resultant voltage to increase substantially in absolute value when the magnitude of said automatic volume control voltage exceeds said predetermined absolute value.

References Cited in the file of this patent

UNITED STATES PATENTS

| | | |
|---|---|---|
| 2,043,092 | Black | June 2, 1936 |
| 2,120,999 | Beers | June 21, 1938 |
| 2,124,600 | Worrall | July 26, 1938 |
| 2,135,942 | Koch | Nov. 8, 1938 |
| 2,211,010 | Hallmark | Aug. 13, 1940 |
| 2,617,929 | Spindler | Nov. 11, 1952 |
| 2,638,538 | Ruben | May 12, 1953 |